United States Patent

Schade et al.

[11] Patent Number: 5,804,662
[45] Date of Patent: Sep. 8, 1998

[54] AGGLOMERATED, FINELY DIVIDED, CROSSLINKED VINYLIMIDAZOLE COPOLYMERS, PREPARATION THEREOF, AND USE THEREOF

[75] Inventors: Christian Schade, Ludwigshafen; Karl-Heinrich Schneider, Kleinkarlbach, both of Germany

[73] Assignee: BASF Aktiengesellschaft, Ludwigshafen, Germany

[21] Appl. No.: 894,364

[22] PCT Filed: Feb. 10, 1996

[86] PCT No.: PCT/EP96/00575

§ 371 Date: Aug. 19, 1997

§ 102(e) Date: Aug. 19, 1997

[87] PCT Pub. No.: WO96/26229

PCT Pub. Date: Aug. 29, 1996

[30] Foreign Application Priority Data

Feb. 20, 1995 [DE] Germany ............ 195 05 750.3

[51] Int. Cl.⁶ .................. C08F 2/24; C08F 2/32; C11D 3/37
[52] U.S. Cl. .......... 525/262; 525/253; 525/254; 252/244
[58] Field of Search .................. 525/262, 253, 525/254, 244

[56] References Cited

U.S. PATENT DOCUMENTS 4,576,973  3/1986  Keil et al. .
5,622,926  4/1997  Schade et al. ............ 525/279

FOREIGN PATENT DOCUMENTS

A 0 412 388  2/1991  European Pat. Off. .
A 0 623 630  11/1994  European Pat. Off. .
A 33 24 835  1/1985  Germany .

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

Agglomerated, finely divided, crosslinked vinylimidazole copolymers obtainable by free-radically initiated polymerization of N-vinylimidazoles of the formula

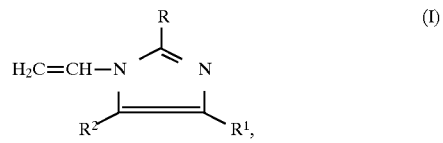

where R, $R^1$ and $R^2$ are identical or different and each is H, $C_1$–$C_4$-alkyl or phenyl, with at least one crosslinker, optionally other water-soluble monoethylenically unsaturated monomers, and optionally water-insoluble monoethylenically unsaturated monomers in the aqueous phase of a water-in-oil emulsion in the presence of at least one emulsifier comprising block copolymers of the type AB or ABA or comb copolymers constructed from A and B, where A is a hydrophobic polymer block having a molecular weight of >500 g/mol and B is a hydrophilic polymer block having a molecular weight of >500 g/mol, to stabilize the water-in-oil monomer emulsion, azeotropic distillative removal of the water from the water-in-oil polymer suspension, and isolation of the polymers, processes for preparing said agglomerated, finely divided, crosslinked vinylimidazole copolymers, and use of the copolymers in detergents to inhibit the transfer of dye during the wash.

8 Claims, No Drawings

AGGLOMERATED, FINELY DIVIDED, CROSSLINKED VINYLIMIDAZOLE COPOLYMERS, PREPARATION THEREOF, AND USE THEREOF

BACKGROUND OF THE INVENTION

The present invention relates to agglomerated, finely divided, crosslinked vinylimidazole copolymers obtainable by free-radically initiated polymerization of N-vinylimidazoles of the formula

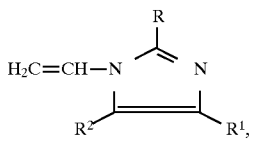

(I)

where R, $R^1$ and $R^2$ are identical or different and each is H, $C_1$–$C_4$-alkyl or phenyl, with at least one crosslinker, optionally other water-soluble monoethylenically unsaturated monomers, and optionally water-insoluble monoethylenically unsaturated monomers in the aqueous phase of a water-in-oil emulsion in the presence of at least one emulsifier to stabilize the water-in-oil monomer emulsion, azeotropic distillative removal of the water from the water-in-oil polymer suspension, and isolation of the polymers, processes for their preparation, and their use in detergents for inhibiting the transfer of dye during the wash.

DESCRIPTION OF THE BACKGROUND

DE-A-3 324 835 discloses crosslinked 1-vinylimidazole polymers prepared by polymerizing 1-vinylimidazole with at least one crosslinker in the aqueous phase of a water-in-oil emulsion in the presence of a lipophilic protective colloid to stabilize the water-in-oil monomer emulsion and of a free-radical polymerization initiator and subsequent azeotropic distillative removal of the water from the water-in-oil polymer suspension and isolation of the beadlike polymers. The water-in-oil monomer emulsion is stabilized using lipophilic protective colloids such as, for example, cellulose derivatives, polymeric maleic acid derivatives with alkyl vinyl ethers, sorbitan esters, ethoxylated fatty acid amides, fatty glyceryl esters and reaction products of polybutadiene oils containing allyl hydrogen atoms with maleic anhydride. The products are beadlike crosslinked vinylimidazole copolymers having an average particle diameter of from 40 to 150 μm.

EP-A-0 412 388 discloses finely divided agglomerated polymer powders prepared by polymerizing water-soluble monomers in the aqueous phase of a water-in-oil emulsion in the presence of water-in-oil emulsifiers and of free-radical polymerization initiators, azeotropic removal of water from the water-in-oil polymer suspensions, agglomeration of the primary particles in the presence of protective colloids, and isolation of the suspended, agglomerated polymer powders. Suitable water-soluble monomers are said to include, for example, mixtures of N-vinylformamide and N-vinylimidazole. The water-soluble monomers can optionally be polymerized in the presence of from 50 to 5,000 ppm of at least one crosslinker. The agglomerated particles have an average particle size of at least 50 μm. On introduction into water they readily disintegrate into the primary particles, which have an average particle size of from 0.1 to 20 μm.

EP-A 0 623 630 discloses water-in-oil polymer emulsions obtainable by polymerizing water-soluble monoethylenically unsaturated monomers in the aqueous phase of a water-in-oil emulsion. The resulting water-soluble polymers have an average particle size of from 0.1 to 20 μm. Suitable monomers are also said to include N-vinylpyrrolidone and N-vinylimidazole. The oil phase of the water-in-oil polymer emulsions contains at least 50% by weight of an oil of vegetable or animal origin. The water-in-oil monomer emulsion is stabilized by means of an emulsifier mixture consisting of the following components:

(a) from 5 to 95% by weight of a block or graft copolymer of the general formula $(A\text{-}COO)_m\text{-}B$, where A is a hydrophobic polymer which has a molecular weight of more than 500 g/mol and is based on a poly (hydroxycarboxylic acid), B is a bifunctional hydrophilic polymer which has a molecular weight of more than 500 g/mol and is based on a polyalkylene oxide, and m is at least 2, and (b) from 5 to 95% by weight of another water-in-oil emulsifier having a molecular weight <1,000 g/mol, for example sorbitan monooleate.

The water-in-oil polymer emulsions additionally contain a wetting agent which, on introduction of the emulsions into water, brings about an inversion of the phases and liberates the polymers, so that they dissolve relatively rapidly. However, the polymers are not isolated in solid form.

SUMMARY OF THE INVENTION

It is an object of the present invention to provide agglomerated, finely divided crosslinked vinylimidazole polymers.

We have found that this object is achieved according to the present invention by agglomerated, finely divided, crosslinked vinylimidazole copolymers obtainable by free-radically initiated polymerization of N-vinylimidazoles of the formula

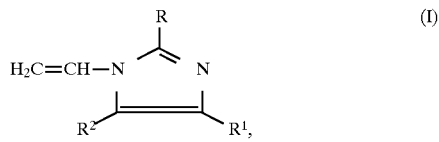

(I)

where R, $R^1$ and $R^2$ are identical or different and each is H, $C_1$–$C_4$-alkyl or phenyl, with at least one crosslinker, optionally other water-soluble monoethylenically unsaturated monomers, and optionally water-insoluble monoethylenically unsaturated monomers in the aqueous phase of a water-in-oil emulsion in the presence of at least one emulsifier to stabilize the water-in-oil monomer emulsion, azeotropic distillative removal of the water from the water-in-oil polymer suspension, and isolation of the polymers, wherefor the emulsifier used comprises block copolymers of the type AB or ABA or comb polymers constructed from A and B, where A is a hydrophobic polymer block having a molecular weight of >500 g/mol and B is a hydrophilic polymer block having a molecular weight of >500 g/mol.

The present invention also provides a process for producing agglomerated, finely divided, crosslinked vinylimidazole copolymers as claimed in claim 1 by free-radically initiated polymerization of N-vinylimidazoles of the formula I with at least one crosslinker, optionally other water-soluble monoethylenically unsaturated monomers, and optionally water-insoluble monoethylenically unsaturated monomers in the aqueous phase of a water-in-oil emulsion in the presence of at least one emulsifier to stabilize the water-in-oil monomer emulsion, azeotropic distillative removal of the water from the water-in-oil polymer suspension, and isolating the finely divided polymers, which comprises using an emulsifier which comprises block copolymers of the type AB or ABA or comb polymers constructed from A and B, where A is a hydrophobic polymer block having a molecular weight of >500 g/mol and B is a hydrophilic polymer block having a molecular weight of >500 g/mol.

DETAILED DESCRIPTION OF THE INVENTION

Examples of suitable monomers of the formula I are 1-vinylimidazole, 1-vinyl-2-methylimidazole, 1-vinyl-2-ethylimidazole, 1-vinyl-2-ethyl-4-methylimidazole, 1-vinyl-2-ethyl-5-methylimidazole, 1-vinyl-4-methylimidazole and 1-vinyl-5-methylimidazole. Of this group of monomers, 1-vinylimidazole and 1-vinyl-2-methylimidazole are particularly preferred. The monomer mixtures used in the polymerization contain, for example, from 10 to 99.9, preferably from 20 to 99.5, very particularly preferably from 35 to 99.5, % by weight of at least one vinylimidazole of the formula I.

Suitable for use as crosslinkers are those monomers which contain at least 2 unconjugated ethylenically unsaturated double bonds in the molecule. Examples of compounds of this type include acrylic esters, methacrylic esters, allyl ethers or vinyl ethers of at least dihydric alcohols. In these compounds, the OH groups of the underlying alcohols can be wholly or partly etherified or esterified; but the crosslinkers contain at least two ethylenically unsaturated groups. Examples of the underlying alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentylglycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis-(hydroxymethyl)cyclohexane, monoester between hydroxypivalic acid and neopentyl glycol, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiopentane-1,5-diol and also polyethylene glycols, polypropylene glycols and polytetrahydrofurans having molecular weights from in each case 200 to 10 000. As well as homopolymers of ethylene oxide and propylene oxide, it is also possible to use block copolymers of ethylene oxide or propylene oxide or copolymers containing built-in ethylene oxide and propylene oxide groups. Examples of underlying alcohols having more than two OH groups are trimethylolpropane, glycerol, pentaerythritol, 1,2,5-pentanetriol, 1,2,6-hexanetriol, tri-ethoxy-cyanuric acid, sorbitan and sugars such as sucrose, glucose and mannose. Of course, the polyhydric alcohols can also be used after reaction with ethylene oxide or propylene oxide in the form of the corresponding ethoxylates or propoxylates.

Further suitable crosslinkers include the vinyl esters or the esters of monohydric unsaturated alcohols with ethylenically unsaturated $C_3$–$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. However, it is also possible to esterify the monohydric unsaturated alcohols with a polybasic carboxylic acid, for example malonic acid, tartaric acid, trimellitic acid, phthalic acid, terephthalic acid, citric acid or succinic acid.

Further suitable crosslinkers include esters of unsaturated carboxylic acids with the above-described polyhydric alcohols, for example of oleic acid, crotonic acid, cinnamic acid or 10-undecenoic acid.

Also suitable are straight-chain or branched, linear or cyclic, aliphatic or aromatic hydrocarbons which have at least two double bonds which must not be conjugated in the case of aliphatic hydrocarbons, for example divinylbenzene, divinyltoluene, 1,7-octadiene, 1,9-decadiene, 4-vinyl-1-cyclohexene, trivinylcyclohexane or polybutadienes having molecular weights of 200–20 000. Also suitable for use as crosslinkers are the acrylamides, methacrylamides and N-allylamines of at least diacid amines. Examples of such amines are 1,2-diaminomethane, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides of allylamine and unsaturated carboxylic acids such as acrylic acid, methacrylic acid, itaconic acid, maleic acid or at least dibasic carboxylic acids as described above.

Also suitable are N-vinyl compounds of urea derivatives and of species with at least two amide, cyanurate or urethane moieties, for example N-vinyl compounds of urea, ethyleneurea, propyleneurea or tartaramide.

Further suitable crosslinkers are divinyldioxane, tetraallylsilane or tetravinylsilane. of course, it is also possible to use mixtures of the aforementioned compounds.

Preferred crosslinkers are di(meth)acrylic esters of polyalkylene oxides having at least 3 ethylene oxide units in the molecule, di- or tri(meth)acrylic esters of polyhydroxy compounds or reaction products thereof with from 1 to 50 ethylene oxide units per OH group, methylenebisacrylamide, ethylenebisacrylamide, divinyldioxane, triallylamine, N,N'-divinylethyleneurea and N,N'-divinyldiimidazole. A particularly preferred crosslinker is N,N'-divinylethyleneurea. The crosslinkers are used in amounts from 0.1 to 90, preferably from 0.2 to 20, % by weight.

The copolymers may also be prepared using other water-soluble monoethylenically unsaturated monomers, for example N-vinylpyrrolidone, N-vinylcaprolactam, N-vinyloxazolidone and N-vinyltriazole. The monomer mixtures used may also contain the following other water-soluble monomers:

acrylamide, methacrylamide, N-methylolacrylamide, 1-vinyl-3-alkylimidazolium salts having from 1 to 30 carbon atoms in the alkyl chain, diethyl- and dimethyl-aminoalkyl (meth)acrylates and diethyl- and dimethyl-aminoalkyl (meth)acrylamides or derived quaternary ammonium salts, hydroxyalkyl (meth)acrylates having from 2 to 6 carbon atoms in the alkyl chain. N-Vinylpyrrolidone is particularly preferred.

The other water-soluble monoethylenically unsaturated monomers optionally used in the copolymerization are used for example in amounts of up to 89.9%, based on the monomer mixture. If they are used for modifying the vinylimidazole copolymers, they are preferably used in amounts from 20 to 80% by weight.

The copolymerization may optionally include water-insoluble monoethylenically unsaturated monomers to modify the crosslinked copolymers. These water-insoluble monomers are merely used in such an amount that the monomer mixtures are still water-soluble. Suitable water-insoluble monoethylenically unsaturated monomers include for example acrylic esters of alcohols having from 1 to 18 carbon atoms, for example methyl acrylate, ethyl acrylate, isobutyl acrylate and 2-ethylhexyl acrylate and also the corresponding esters of methacrylic acid, vinyl esters of saturated $C_1$–$C_4$-carboxylic acids, for example vinyl formate, vinyl acetate, vinyl propionate and vinyl butyrate and also maleic esters, for example dimethyl maleate.

If water-insoluble monoethylenically unsaturated monomers are included as modifiers in the polymerization, these monomers are preferably used in amounts from 0.1 to 20% by weight.

The crosslinked copolymers are synthesized by the known methods of inverse suspension or emulsion polymerization whereby the monomers are emulsified in aqueous solution in a water-immiscible solvent using an emulsifier to stabilize the water-in-oil monomer emulsion and polymerized using at least one free-radical polymerization initiator. The emulsifier used to stabilize the water-in-oil monomer emulsion according to the present invention comprises block copolymers of the type AB or ABA or comb copolymers constructed from A and B, where A is a hydrophobic polymer block having a molecular weight of more than 500 g/mol and B is a hydrophilic polymer block having a molecular weight of more than 500 g/mol.

The oil phase of the reaction mixture can be any solvent which is less than 5% miscible with water at 25° C.

Examples of suitable solvents are silicones and aliphatic, aromatic or chlorinated hydrocarbons having a boiling range from 40° to 200° C. The preferred hydrocarbons are pentane, hexane, cyclohexane, heptane, octane, isooctane, methylcyclohexane, toluene, xylene or mixtures thereof. Preference is given to using hydrocarbons having a boiling range from 50° to 150° C. The oil phase of the water-in-oil polymer suspensions comprises in most cases for example from 30 to 90% by weight, based on the total emulsion.

The polymerization of the monomers is carried out in the presence of the customary polymerization initiators, for example compounds such as potassium peroxodisulfate, ammonium peroxodisulfate, 2,2'-azobis(2-amidinopropane) dihydrochloride, 4,4'-azobis(4-cyanopentanoic acid), 2,2'-azobisisobutyronitrile, 2,2'-azobis-(2-methylbutyronitrile), 2,2'-azobis(2,4-dimethylvaleronitrile), tert-butyl peroctoate, tert-amyl perpivalate, tert-butyl perneodecanoate and tert-butyl perpivalate, and also redox systems, for example mixtures of ammonium persulfate and iron(II) sulfate. The polymerization initiators are used in customary amounts, for example from 0.01 to 3, preferably from 0.02 to 2, % by weight, based on the monomers. The polymerization can be carried out for example by first substantially polymerizing the monomers in the presence of from 0.5 to 1% by weight of at least one initiator and adding a further 0.5–1% by weight, based on the amount of monomers originally used, in the course of a postpolymerization. The postpolymerization can be carried out for example at the same temperature as the main polymerization or else at higher temperatures, for example at temperatures which are from 5° to 40° C. above the temperature at which the main polymerization is carried out. It is possible to use a single initiator or else a mixture of different initiators. In some cases it is advantageous to use a mixture of two initiators which have different half-lives.

The emulsifiers used according to the present invention for stabilizing the water-in-oil emulsion are constructed from at least one hydrophilic and at least one hydrophobic block, the blocks each having molecular weights of more than 500 to 100,000, preferably from 550 to 50,000, very particularly preferably from 600 to 20,000. The emulsifiers can have a comblike or linear construction. Linear block copolymers of the type AB or of the type ABA, where A is a hydrophobic polymer block and B is a hydrophilic polymer block, are known; cf. EP-A-0 000 424 and EP-A-0 623 630. Preferably the emulsifiers to be used are soluble in the water-immiscible solvent used.

The hydrophilic blocks are separately soluble in water at 25° C. to more than 1%, preferably 5% by weight. Examples are blocks constructed from ethylene oxide, propylene oxide or butylene oxide units, optionally intermixed. The hydroxyl groups of the alkylene oxide blocks can be additionally modified by sulfate or phosphate ester groups. Suitable further blocks are derived from polytetrahydrofuran, poly (1,3-dioxolane), poly(2-methyl-2-oxazoline), polyethyleneimine, polyvinyl alcohol, polyvinylamine, polyvinylpyrrolidone, poly(meth)acrylic acid, polyamidoamines, gelatin, cellulose derivatives or starch. Particular preference is given to blocks based on ethylene oxide and/or propylene oxide units.

The hydrophobic parts of the emulsifiers consist for example of blocks of polystyrene, polyalkyl (meth) acrylates, polysiloxanes, poly(hydroxyalkanoic acids) such as polycondensates of 2-hydroxypropanoic acid, 2-hydroxybutanoic acid, 2-hydroxyisobutanoic acid, 2-hydroxyheptanoic acid, 10-hydroxydecanoic acid, 12-hydroxydodecanoic acid, 12-hydroxystearic acid, 16-hydroxyhexadecanoic acid, 2-hydroxystearic acid, 2-hydroxyvaleric acid or the corresponding condensates obtained from lactones, condensates of diols and dicarboxylic acids such as polyethylene adipate, polylactams such as polycaprolactam, polyisobutylene or polyurethanes. Preference is given to blocks of polystyrene, polymethyl methacrylate, polybutyl methacrylate, polyhydroxyalkanoic acids having more than 10 carbon atoms in the alkane unit, polydimethylsiloxanes or polyisobutylenes. Very particular preference is given to blocks of polystyrene, polyhydroxy fatty acids such as poly(12-hydroxystearic acid) or polydimethylsiloxanes.

Of these compounds, preference for use as emulsifier is given to those block copolymers where A is a hydrophobic polymer block selected from the group consisting of polystyrene, poly(hydroxycarboxylic acid)s, polydimethylsiloxanes and polyisobutylenes, and B is a hydrophilic polymer block from the group of the $C_2$–$C_4$-polyalkylene glycols.

The emulsifiers to be used according to the present invention are used in amounts from 0.1 to 15, preferably from 0.2 to 10, very particularly preferably from 0.5 to 7, % by weight, based on the monomers.

The polymerization may be carried out in the additional presence of those emulsifiers which are customarily used in the inverse emulsion polymerization. If such emulsifiers are used, the polymerization is carried out in the additional presence of from 0.1 to 10% by weight, preferably from 0.2 to 7% by weight, of at least one water-in-oil emulsifier from the group of the esters of $C_8$–$C_{22}$-carboxylic acids with glycerol, sorbitan, sucrose, polyglycerol or the corresponding ethoxylated alcohols, adding up to 80 mol of ethylene oxide per mole of the alcohols.

The preparation of the water-in-oil polymers can optionally be carried out in the additional presence of up to 10% by weight, based on the total emulsion, of a wetting agent having an HLB value of more than 10. (For the definition of the HLB value cf. W. C. Griffin, J. Soc. Cosmet. Chem. 1 (1950), 311.) Examples of suitable wetting agents having an HLB value of more than 10 are ethoxylated alkylphenols, dialkyl esters of sodium sulfosuccinates where the alkyl group has at least 3 carbon atoms, soaps derived from fatty acids having from 10 to 22 carbon atoms, alkali metal salts of alkyl or alkenyl sulfates having from 10 to 26 carbon atoms and also ethoxylated fatty alcohols and ethoxylated amines.

The polymerization is carried out in a conventional manner, for example by heating the water-in-oil monomer emulsions under agitation at temperatures within the range from 30° to 140° C., preferably from 40° to 120° C. The polymer concentration is for example from 5 to 60% by weight, based on the total suspension. To recover the polymers from the emulsions, the water is removed from the water-in-oil polymer suspension by an azeotropic distillation. The removal of the water leaves polymer suspensions from which the polymer is readily recoverable, for example by centrifugation or filtration. An important feature of the invention is that the polymers obtained are present in agglomerated form. The agglomerates are composed of primary particles which have an average particle diameter of up to 35 µm. The size of the primary particles is in most cases below 20 µm, preferably within the range from 0.05 to 5 µm. The agglomerates have average particle diameters which are for example within the range from 1 to 250 µm, preferably from 2 to 100 µm. The process is especially conducted in such a way as to produce agglomerated particles having a size from 2.5 to 35 µm. The agglomerates are frequently formed even during the polymerization phase itself. The agglomeration may in addition occur during the azeotropic distillation.

The agglomeration can be augmented by addition of an assistant, for example by addition of polyethylene glycols, polypropylene glycols, polyvinyl alcohols or partially hydrolyzed polyvinyl acetates, copolymers of maleic anhydride and alkenes, copolymers of ethylene and acrylic acid, copolymers of maleic acid and acrylic acid, cellulose ethers, cellulose esters, carboxymethylcelluloses, polyols such as glycerol, ethylene glycol, propylene glycol or butylene glycol or polyvinylpyrrolidones. The amount of the agglomeration assistant renders from 0.1 to 15, preferably from 0.2 to 10, % by weight, based on the amount of the polymer. Customarily the assistant is only added to the water-in-oil polymer suspension after the polymerization has ended. The above-specified particle sizes for the agglomerated particles refer to the water-free polymers. On stirring into water the agglomerates can disintegrate into smaller agglomerates or into the primary particles.

The agglomerated, finely divided, crosslinked copolymers are used for example in detergents in amounts from 0.1 to 4% by weight, based on the detergent formulation, for inhibiting the transfer of dye during the wash. The finely divided, crosslinked copolymers are also suitable for absorbing heavy metals from wastewaters or beverages.

The percentages in the Examples are by weight.

Block copolymer 1

ABA block copolymer of polyhydroxystearic acid and polyethylene oxide having a molecular weight of about 7,500, available from ICI under the name of Hypermer B 246.

Block Copolymer 2

AB block copolymer with a polystyrene unit having a molecular weight of about 3,000 and a polyethylene oxide block having about ethylene oxide units in the molecule.

Block copolymer 3

Alkyl- and polyether-modified polydimethylsiloxane; available from Goldschmidt AG, Germany, under the name of "Tegopren 7006".

EXAMPLE 1

A stirred apparatus equipped with a reflux condenser was charged with a mixture of 800 g of cyclohexane, 5 g of sorbitan monooleate, 5 g of block copolymer 1 and 1 g of 2,2'-azobis(2-methylbutyronitrile), and the contents were heated under nitrogen to a gentle boil under reflux with stirring. At that temperature a stream of 100 g of N-vinylpyrrolidone, 100 g of N-vinylimidazole, 10 g of N,N'-divinylethyleneurea and 140 g of water was added over 30 minutes. The batch was gently refluxed for a further 6 hours.

The water was then azeotropically distilled off, and the product obtained was filtered off and dried in a vacuum drying cabinet at 50° C. The product obtained was a fine white powder consisting of agglomerates having an average particle size of 5.6 µm (determined by Fraunhofer diffraction in cyclohexane suspension). A scanning electron micrograph of the dried powder showed that the agglomerates were made up of smaller, primary particles having an average particle diameter within the range from 0.1 to 0.5 µm. The water-soluble fraction of the polymer, determined by extraction in a Soxhlet apparatus, was less than 2%.

EXAMPLES 2 to 9

Example 1 was repeated with the respective changes indicated in the table. The table likewise indicates the average particle sizes of the agglomerates.

TABLE

| Example | N-Vinyl-imidazole | N-Vinyl-pyrrolidone | Polymulsifier | Emulsifier | Average size of agglomerated particles |
|---|---|---|---|---|---|
| 2 | 134 g | 66 g | 5 g of block copolymer 1 | 5 g of sorbitan monooleate | 12.1 µm |
| 3 | 66 g | 134 g | 5 g of block copolymer 1 | 5 g of sorbitan monooleate | 24.5 µm |
| 4 | 100 g | 100 g | 5 g of block copolymer 1 | 5 g of sorbitan monolaurate | 6.0 µm |
| 5 | 100 g | 100 g | 5 g of block copolymer 1 | 5 g of emulsifier 1[a)] | 1.5 µm[b)] |
| 6 | 125 g | 75 g | 2.5 g of block copolymer 1 | 2,5 g of sorbitan monooleate | 43.2 µm |
| 7 | 100 g | 100 g | 5 g of block copolymer 2 | 5 g of sorbitan | 21.4 µm |

TABLE-continued

| Example | N-Vinyl-imidazole | N-Vinyl-pyrrolidone | Polymulsifier | Emulsifier | Average size of agglomerated particles |
|---|---|---|---|---|---|
| 8 | 100 g | 100 g | 5 g of block copolymer 3 | 5 g of polyoxyethylene sorbitan monooleate | 17.3 μm |
| 9 | 100 g | — | 5 g of block copolymer 1 | 2 g of glyceryl sesquioleate | 8.8 μm |

[a)]Emulsifier 1: glyceryl monooleate after reaction with 25 ethylene oxide units per molecule.
[b)]After azeotropic drying the reaction product was a fine, sedimentation-stable suspension, which was isolated by evaporation. The particle size was determined prior to evaporation.

We claim:

1. Agglomerated, finely divided, crosslinked vinylimidazole copolymers obtained by free-radically initiated polymerization of N-vinylimidazoles of the formula

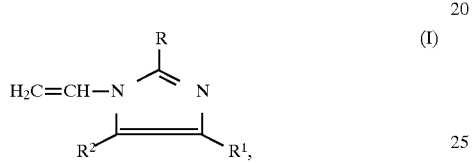

where R, $R^1$ and $R^2$ are identical or different and each is H, $C_1$–$C_4$-alkyl or phenyl, with at least one crosslinker, optionally other water-soluble monoethylenically unsaturated monomers, and
optionally water-insoluble monoethylenically unsaturated monomers
in the aqueous phase of a water-in-oil emulsion in the presence of at least one emulsifier to stabilize the water-in-oil monomer emulsion, azeotropic distillative removal of the water from the water-in-oil polymer suspension, and isolation of the finely divided polymers comprising agglomerates of primary particles having an average particle diameter of up to 35 μm, the agglomerates having an average particle diameter within the range from 1 to 250 μm, wherefor the emulsifier used is selected from block copolymers of the type AB or ABA or comb copolymers constructed from A and B, where A is a hydrophobic polymer block having a molecular weight of >500 g/mol and B is a hydrophilic polymer block having a molecular weight of >500 g/mol.

2. A process for producing agglomerated, finely divided, crosslinked vinylimidazole copolymers as claimed in claim 1 by free-radically initiated polymerization of N-vinylimidazoles of the formula

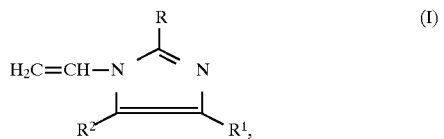

where R, $R^1$ and $R^2$ are identical or different and each is H, $C_1$–$C_4$-alkyl or phenyl, with at least one crosslinker, optionally other water-soluble monoethylenically unsaturated monomers, and
optionally water-insoluble monoethylenically unsaturated monomers
in the aqueous phase of a water-in-oil emulsion in the presence of at least one emulsifier to stabilize the water-in-oil monomer emulsion, azeotropic distillative removal of the water from the water-in-oil polymer suspension, and isolating the finely divided polymers comprising agglomerates of primary particles having an average particle diameter of up to 35 μm, the agglomerates having an average particle diameter within the range from 1 to 250 μm, which comprises using an emulsifier selected from block copolymers of the type AB or ABA or comb copolymers constructed from A and B, where A is a hydrophobic polymer block having a molecular weight of >500 g/mol and B is a hydrophilic polymer block having a molecular weight of >500 g/mol.

3. A process as claimed in claim 2, wherein the emulsifier used is selected from block copolymers where
A is a hydrophobic polymer block selected from the group consisting of polystyrene, poly(hydroxycarboxylic acid)s, polydimethylsiloxanes and polyisobutylenes, and
B is a hydrophilic polymer block selected from the group of the $C_2$–$C_4$-polyalkylene glycols.

4. A process as claimed in claim 2, wherein the emulsifiers are used in amounts from 0.1 to 15% by weight, based on the monomers.

5. A process as claimed in claim 2, wherein the polymerization is carried out in the additional presence of from 0.1 to 10% by weight of at least one water-in-oil emulsifier selected from the group of the esters of $C_8$–$C_{22}$-carboxylic acids with glycerol, sorbitan, sucrose, polyglycerol or the corresponding ethoxylated alcohols, up to 80 mol of ethylene oxide being added per mole of the alcohols.

6. A method of inhibiting the transfer of dye during washing, comprising washing with a composition comprising a detergent and 0.1 to 4% by weight of the copolymer according to claim 1.

7. A detergent composition comprising a detergent and a dye transfer inhibiting amount of the product of claim 1.

8. The detergent composition of claim 7, wherein the copolymer is present in an amount of from 0.1 to 4% by weight, based on the composition.

* * * * *